E. R. DONALDSON.
POULTRY FEEDER.
APPLICATION FILED NOV. 10, 1909.
955,503.
Patented Apr. 19, 1910.
2 SHEETS—SHEET 1.
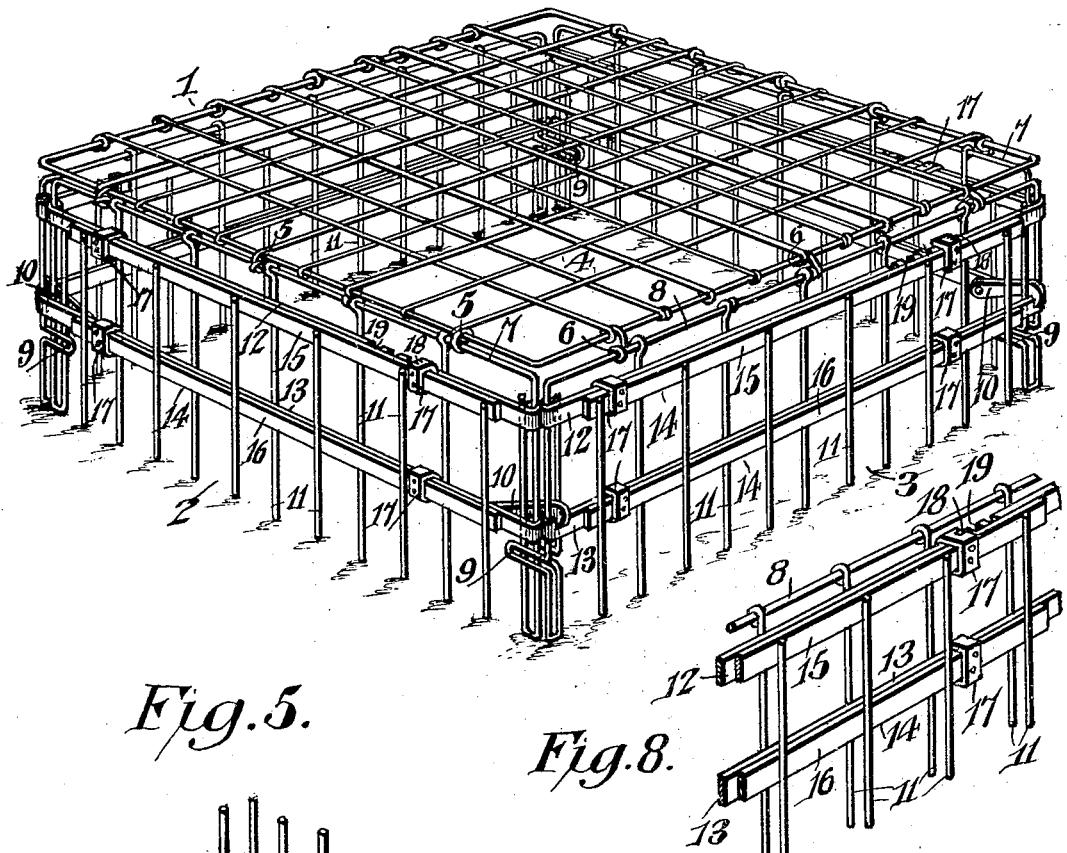
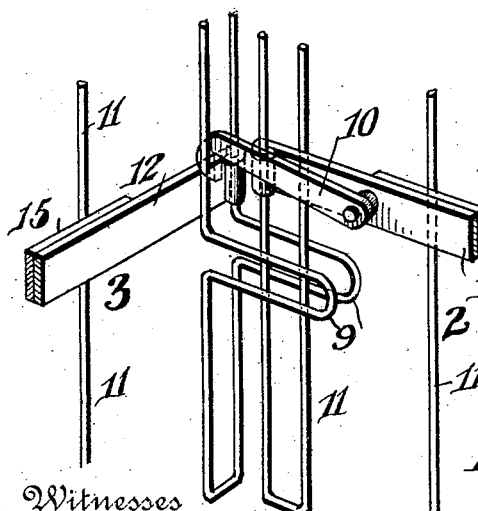
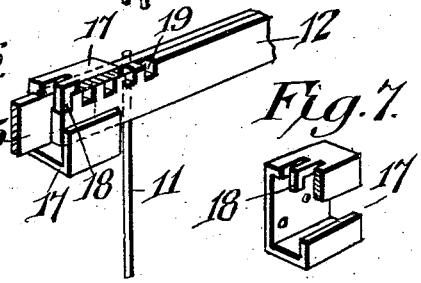
E. R. Donaldson, Inventor

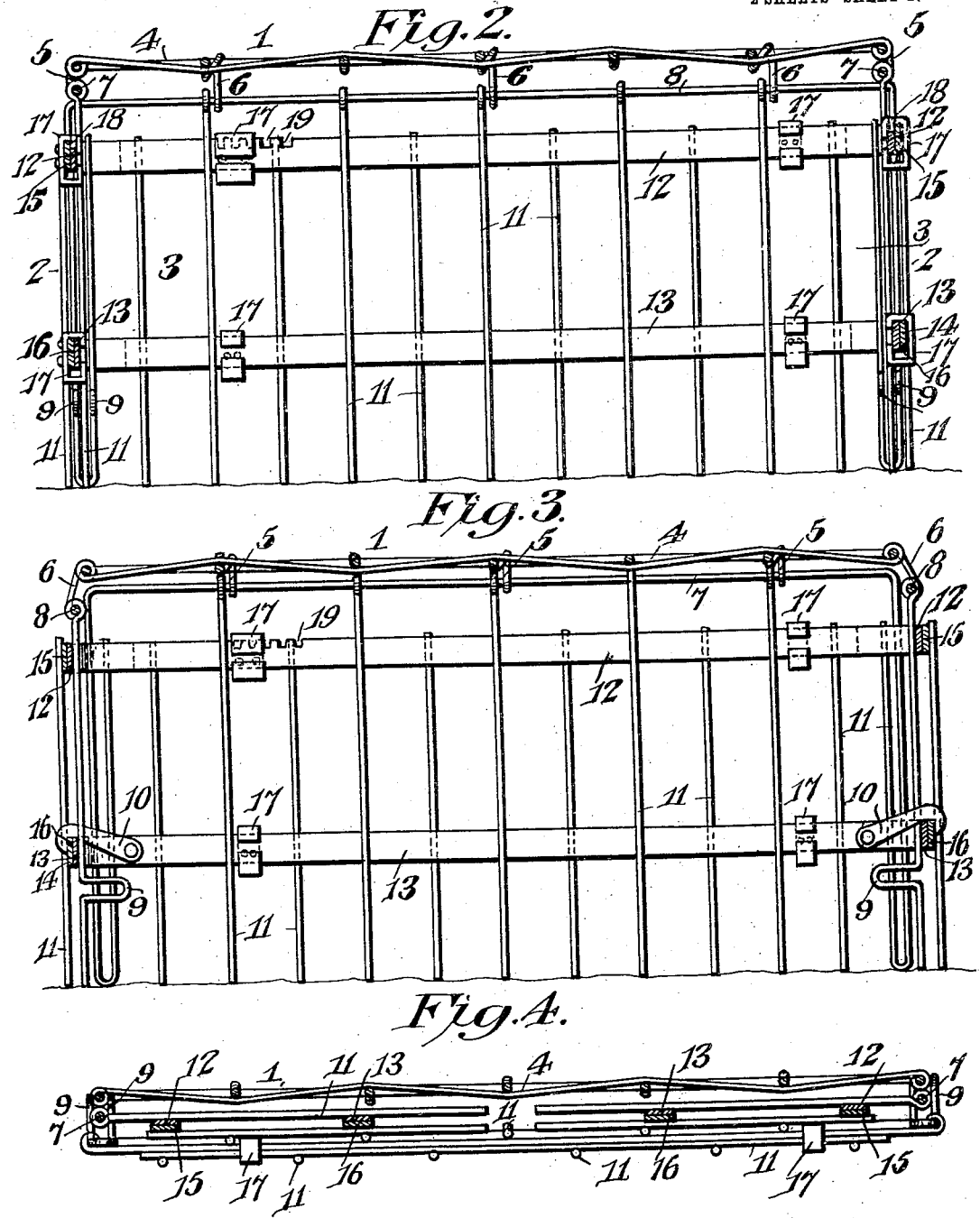

UNITED STATES PATENT OFFICE.

ESPEY RICHARD DONALDSON, OF SHARPSBURG, KENTUCKY.

POULTRY-FEEDER.

955,503.   Specification of Letters Patent.   Patented Apr. 19, 1910.

Application filed November 10, 1909. Serial No. 527,335.

*To all whom it may concern:*

Be it known that I, ESPEY R. DONALDSON, a citizen of the United States, residing at Sharpsburg, in the county of Bath and State of Kentucky, have invented a new and useful Poultry-Feeder, of which the following is a specification.

The invention relates to a poultry feeder.

The object of the present invention is to provide a simple and comparatively inexpensive poultry feeder of great strength and durability, adapted when not in use to be compactly folded, and capable of being readily moved from one point to another, whereby a clean feeding ground may be obtained and better sanitary conditions maintained.

Another object of the invention is to provide an inclosure in which young fowls may be fed, and where old ones cannot intrude, thereby lessening the mortality of young chickens and other fowls by preventing them from being trampled upon in the struggle for food, and at the same time enabling them to eat undisturbed and at leisure, which results in better digestion and healthier fowls.

The invention also has for its object to provide a poultry feeder of this character, capable of adjustment to vary the size of the entrance to suit the size of the fowls to be fed.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a poultry feeder, constructed in accordance with this invention and arranged for use. Fig. 2 is a vertical sectional view of the same. Fig. 3 is a similar view, taken at right angles to Fig. 2. Fig. 4 is a sectional view, showing the parts folded. Fig. 5 is a detail perspective view of a portion of one of the corners of the poultry feeders, illustrating the manner of securing the sides together. Figs. 6 and 7 are detail perspective views, illustrating the construction for securing the slidable members in their adjustment. Fig. 8 is a detail view of a portion of one of the sides, illustrating a different adjustment of the slidable member for varying the size of the entrance openings.

Like numerals of reference designate corresponding parts in all the figures of the drawings.

The poultry feeder comprises in its construction a top 1 and hinged sides 2 and 3, foldable inwardly beneath the top to arrange the poultry feeder in compact form, as illustrated in Fig. 4 of the drawings, so that it may be easily stored when not in use. The top is composed of crossed or woven wires, forming interstitial apertures 4 of sufficient size to permit the feed to be dropped through the top of the feeder into the inclosure afforded by the same. By this construction the ground inclosed by the device may be sprinkled with feed, so that young chickens and other fowls may feed freely undisturbed and at their leisure.

The poultry feeder may be of any desired size and may be either oblong or square, and the top is provided at its edges with eyes 5 and 6, extending below the top different distances to space the sides 2 and 3 properly, so that the same will fold compactly and without straining the hinge connections. The opposite sides 2 are provided at the top with horizontal pintle wires 7, which are arranged in the eyes 5, and the other sides or walls are provided at the top with pintle wires 8, which pass through the eyes 6. The eyes 6 extend below the eyes 5, and the sides or walls 3 are folded after the other sides or walls 2 have been folded beneath the top.

The sides or walls 3 are provided at their ends with spaced inwardly projecting loops 9, forming parallel portions between which are arranged the ends of the other sides 2, whereby the latter are held against inward and outward swinging movement. The end portions of the sides or walls 2 are maintained in engagement with the horizontally projecting portions 9 of the sides 3 by catches 10, pivoted to the sides 2 and engaging the sides 3. Each side or wall is composed of vertical wires or rods 11, and upper and lower horizontal connecting strips 12 and 13 of stout sheet metal, or other suitable material, which may have the wires or rods secured to them in any desired manner, such as by soldering, electric welding, or other well known means. The catches 10 engage the lower metallic strips of the sides 3, and are preferably pivoted to the lower metallic strips of the sides 2. The lower metallic strips and the lower portions of the rods or wires 11 form entrance openings to the feeder to permit the young chickens, or other fowls to enter the same. These entrance spaces are varied in size by slidable members 14, mounted on each of the sides or walls and composed of upper and lower horizontal strips 15 and 16, and vertical rods or wires. The vertical rods or wires of the slidable members 14 are adapted to be arranged at different points between the vertical wires or rods 11 of the sides or walls to provide entrances of the desired size. The slidable members are mounted on the sides by means of approximately rectangular loops 17, secured to the horizontal connecting pieces of the slidable members and embracing the horizontal connecting pieces or strips of the sides or walls. One of the upper loops of each of the slidable members is split at the top, and the split portion is bent downward to form an inwardly projecting tooth 18, adapted to engage any one of a series of notches or recesses 19, formed in the upper edge of the upper horizontal strip 12. When the tooth 18 is engaged with one of the recesses or notches 19 the slidable member is securely held in its adjustment. When the slidable members are adjusted to permit fowls of a certain size to enter the feeder, older and larger fowls are positively excluded, and are prevented from eating the food prepared for young fowls. This not only effects a saving in the amount of food consumed by preventing the older fowls from eating food, which is not necessary for them, but saves time in feeding fowls as it obviates the necessity of guarding young fowls in order that they may be properly fed.

Having thus fully described my invention, what I claim as new and desire to secure by Letters Patent, is:—

1. A poultry feeder including a top, and sides or walls hinged to and supporting the top and foldable against the same, said sides or walls being provided with entrance openings to permit young fowls to enter and leave the feeder.

2. A poultry feeder including a top, and sides or walls hinged to and supporting the top and foldable against the same, said sides or walls being provided with entrance openings to permit young fowls to enter and leave the feeder and the top having apertures to permit the feed to be dropped within the feeder.

3. A poultry feeder including a top, and sides or walls having entrance openings for young fowls, and slidable members mounted on the sides or walls and provided with means for varying the size of the entrance openings.

4. A poultry feeder including a top, sides or walls supporting the top and having spaced wires forming entrance openings for young fowls, and slidable members mounted on the sides or walls and having spaced wires arranged at the entrance openings and adjustable over the same to vary the size thereof.

5. A poultry feeder including a top, sides or walls supporting the top and composed of vertical wires and horizontal connecting strips, the wires being spaced apart to form entrance openings for young fowls, and slidable members mounted on the sides and composed of vertical wires and horizontal connecting strips and adjustable to vary the size of the entrance openings.

6. A poultry feeder including a top, sides or walls supporting the top and composed of vertical wires and horizontal connecting strips, the wires being spaced apart to form entrance openings for young fowls, slidable members arranged at the sides or walls and composed of horizontal strips and vertical wires and adapted to vary the size of the entrance openings, and loops embracing the horizontal strips and slidably connecting the said members with the sides or walls.

7. A poultry feeder including a top, sides or walls supporting the top and composed of vertical wires and horizontal connecting strips, the wires being spaced apart to form entrance openings for young fowls, slidable members arranged at the sides or walls and composed of horizontal strips and vertical wires and adapted to vary the size of the entrance openings, and loops embracing the horizontal strips and slidably connecting the said members with the sides or walls, one of the loops of each member being provided with a projecting tooth arranged to engage the contiguous strip of the side or wall to secure the slidable member in its adjustment.

8. A poultry feeder including a top, sides or walls supporting the top and composed of vertical wires and horizontal connecting strips, the wires being spaced apart to form entrance openings for young fowls, slidable members arranged at the sides or walls and composed of horizontal strips and vertical wires and adapted to vary the size of the entrance openings, and loops embracing the horizontal strips and slidably connecting the said members with the sides or walls, one of the loops of each member being provided with an inwardly projecting portion and the contiguous strips of the adjacent side or wall being provided with notches to receive the tooth.

9. A poultry feeder including a top, hinged sides or walls supporting the top, one side or wall having projecting portions to receive the adjacent side or wall, and the latter being provided with a catch for maintaining the parts in such engagement.

10. A poultry feeder including a top, hinged sides or walls supporting the top, two of the opposite walls being provided at their ends with horizontally projecting loops receiving the ends of the other sides or walls, and catches mounted on the latter and engaging the sides or walls having the loops.

In testimony, that I claim the foregoing as my own, I have hereto affixed my signature in the presence of two witnesses.

ESPEY RICHARD DONALDSON.

Witnesses:
T. E. ADAMS,
A. L. DONALDSON.